United States Patent
Taylor

(10) Patent No.: US 6,359,838 B1
(45) Date of Patent: *Mar. 19, 2002

(54) KEYPAD ARRANGEMENT FOR A WATCH RADIOTELEPHONE

(75) Inventor: Terrance Nelson Taylor, Glenview, IL (US)

(73) Assignee: Motorola, Inc., Schaumburg, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/690,708

(22) Filed: Jul. 31, 1996

(51) Int. Cl.[7] .......................... G04B 47/02; H04M 1/00; H04M 9/00
(52) U.S. Cl. ...................................... 368/13; 379/433.1
(58) Field of Search ............................ 368/10, 13, 281, 368/282, 69, 70, 378; 379/90, 428, 440, 428.1–428.04, 433.01–433.1; 364/705

(56) References Cited

U.S. PATENT DOCUMENTS

| | | | |
|---|---|---|---|
| 3,032,651 A | 5/1962 | Gisiger-Stahli et al. | |
| 3,971,206 A | 7/1976 | Martino | |
| 4,055,755 A | * 10/1977 | Nakamura et al. | 364/705 |
| 4,120,036 A | * 10/1978 | Maeda et al. | 364/705 |
| 4,334,315 A | 6/1982 | Ono et al. | |
| 4,552,464 A | * 11/1985 | Rogers | 368/10 |
| 4,754,285 A | 6/1988 | Robitaille | |
| 4,821,532 A | 4/1989 | Jaques et al. | |
| 4,847,818 A | 7/1989 | Olsen | |
| 5,008,864 A | * 4/1991 | Yoshitake | 368/10 |
| 5,235,560 A | 8/1993 | Seager | |
| 5,235,561 A | 8/1993 | Seager | |
| 5,239,521 A | 8/1993 | Blonder | |
| 5,265,265 A | 11/1993 | Hama et al. | |
| 5,467,324 A | * 11/1995 | Houlihan | 368/10 |
| 5,479,163 A | 12/1995 | Samulewicz | |
| 5,508,978 A | 4/1996 | Kalbermatter et al. | |
| 5,559,761 A | * 9/1996 | Frenkel et al. | 368/65 |

FOREIGN PATENT DOCUMENTS

| | | |
|---|---|---|
| CH | 644 723 A5 | 8/1984 |
| EP | 0698983 | 2/1996 |
| EP | 0715233 A1 | 6/1996 |
| GB | 2 207 262 A | 1/1989 |
| JP | 57-46189 A | 7/1982 |
| JP | 57163890 * | 8/1982 |
| JP | 61111485 * | 5/1986 |
| JP | 08122461 A | 5/1996 |

OTHER PUBLICATIONS

Siemens NotePhone® Bedienungsanleitung Teil 2 Newton—Handbuch [Service Guide Part 2 Newton Handbook], 1994, at 147, 170–71.

* cited by examiner

Primary Examiner—Vit Miska
(74) Attorney, Agent, or Firm—Sylvia Y. Chen; Randall S. Vaas; Roland K. Bowler II

(57) ABSTRACT

A watch radiotelephone (10) comprises a watch face (12) and a keypad (14). The watch face (12) indicates a time of day in an analog format. The analog format includes twelve indicia (32–43) positioned around a perimeter (30) of the watch face (12). The twelve indicia (32–43) represent and correspond to twelve hours in a day in the analog format. The keypad (14) includes twelve keys (46–57). Individual keys (46, 47, 48, 49, 50, 51, 52, 53, 54, 55, 56, 57) of the twelve keys (46–57) are positioned to correspond with individual (32, 33, 34, 35, 36, 37, 38, 39, 40, 41, 42, 43) of the twelve indicia (32–43). A user of the watch radiotelephone (10) is permitted to actuate a predetermined number of the twelve keys (46–58) of the keypad (14) in a predetermined sequence to enter a telephone number in accordance with a user's familiarity of the twelve indicia (32–43) located around the perimeter (30) of the watch face (12). A timekeeping circuit (118) provides the time of day to the watch face (12). A radio frequency (RF) transmitter (92) transmits a RF signal representative of the telephone number.

21 Claims, 2 Drawing Sheets

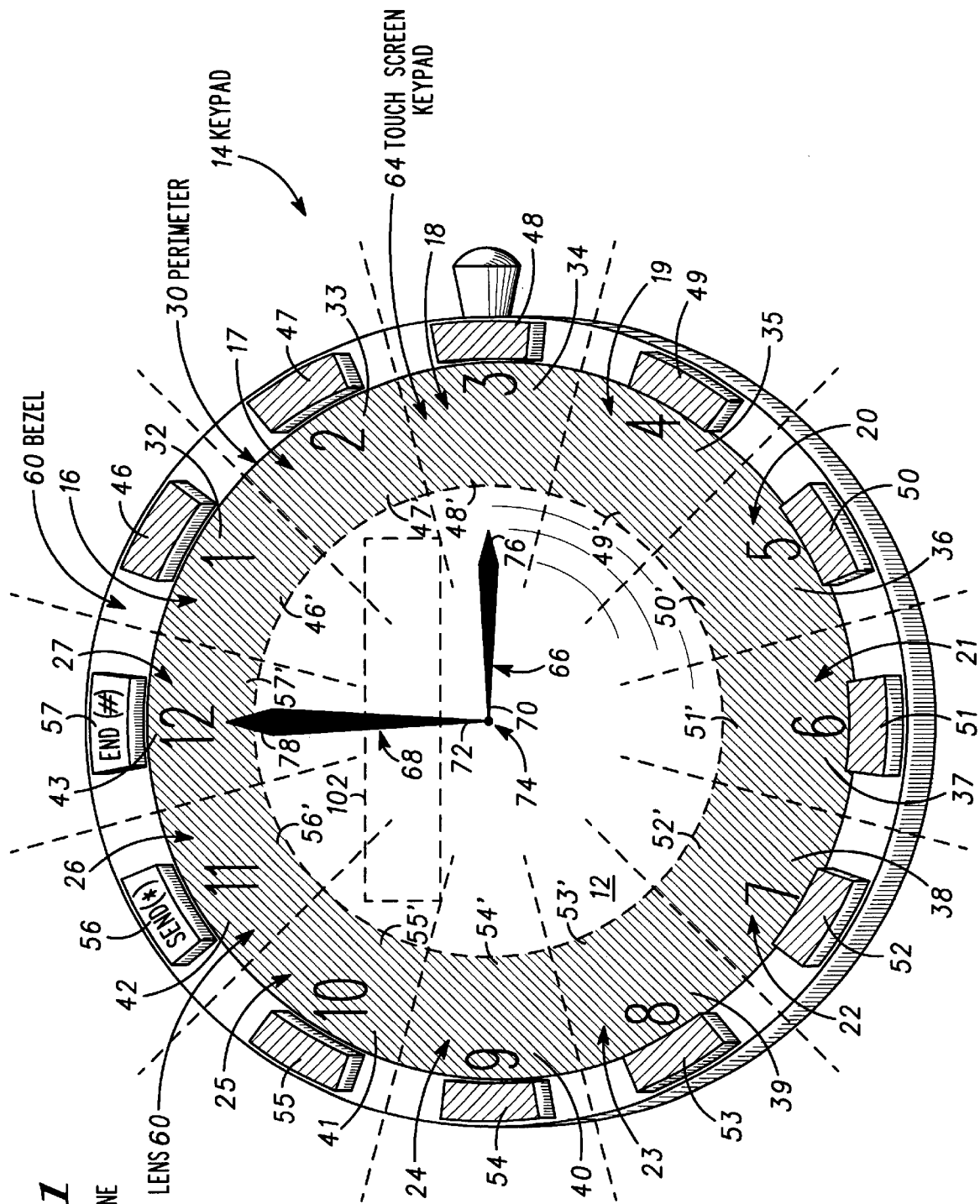

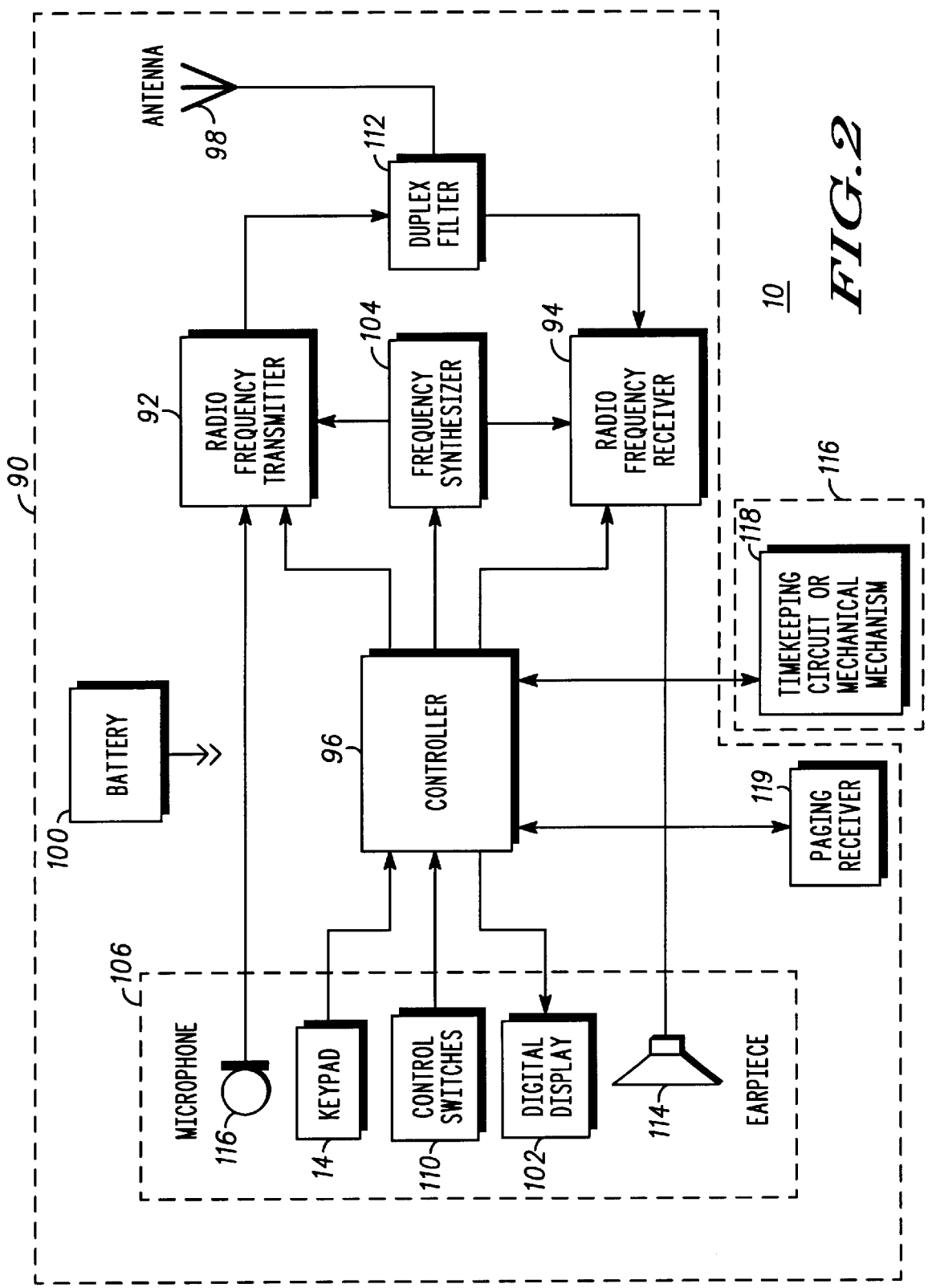

KEYPAD ARRANGEMENT FOR A WATCH RADIOTELEPHONE

FIELD OF THE INVENTION

The present invention relates generally to watch radiotelephones, and more particularly to a keypad arrangement for a watch radiotelephone.

BACKGROUND OF THE INVENTION

Recent progress in microelectronics has promoted the miniaturization of portable radiotelephone components such as transmitters and receivers. This miniaturization has permitted the integration of these components into wrist carried portable radiotelephones.

Telephone number entry is a fundamental function needed for a portable radiotelephone. Typically, telephone numbers are manually entered into the portable radiotelephone by actuating keys of a keypad. The keys of a portable radiotelephone generally include: 1, 2, 3, 4, 5, 6, 7, 8, 9, *, 0 and #. The keys are traditionally arranged in a twelve key matrix pattern represented by three columns by four rows. Because the twelve key matrix pattern is a standard in the telephone industry, users have become familiar with the location of each of the individual keys in the twelve key matrix pattern. On a hand held portable radiotelephone there is usually enough space to place the twelve key matrix using adequately sized keys. However, on a wrist carried portable radiotelephone, there is very little space to place the twelve key matrix using twelve adequately sized keys. Presently, the twelve key matrix is shrunk to a very small size to fit on a face surface of a wrist carried portable radiotelephone. However, the lettering on such small keys are difficult to read and the small keys are difficult to actuate with fingers. Further, the small twelve key matrix has a calculator type appearance which is sometimes not considered aesthetically pleasing or fashionable.

Alternatively, telephone numbers are also entered using voice recognition. However, there are situations where voice recognition is not effective. For example voice recognition is not effective in noisy environments or when a person's voice is not easily recognized by the voice recognition program. Therefore, although voice recognition may be available, a need remains for some type of manual telephone number entry.

Accordingly, there is a need for a keypad arrangement suitable for a watch radiotelephone which provides for manual telephone number entry, is familiar to a user, is easy to actuate using fingers and is aesthetically pleasing.

BRIEF DESCRIPTION OF THE DRAWINGS

FIG. 1 illustrates a perspective view of a watch radiotelephone.

FIG. 2 illustrates a block diagram of the watch radiotelephone.

DETAILED DESCRIPTION OF THE PREFERRED EMBODIMENT

FIG. 1 illustrates a perspective view of a watch radiotelephone 10. A watch is a portable timepiece. A radiotelephone is a device which communicates information using electromagnetic waves in the radio frequency range. Therefore, the watch radiotelephone 10 combines the functions of a portable timepiece and a radiotelephone into a single unit.

The watch radiotelephone 10 is preferably carried on a user's wrist. Alternatively, the watch radiotelephone 10 may be carried in a pocket like a pocket watch, hung by a cord as a pendant or attached to an article using a clip.

The watch radiotelephone 10 comprises a watch face 12 and a keypad 14. The watch face 12 includes a plurality of areas 16–27 located around a perimeter 30 of the watch face 12 corresponding to locations of a plurality of indicia 32–43 representing a time a day in an analog format. The keypad 14 includes a plurality of keys 46–57. Individual keys 46, 47, 48, 49, 50, 51, 52, 53, 54, 55, 56, 57 of the plurality of keys 46–57 are positioned to correspond with individual areas 16, 17, 18, 19, 20, 21, 22, 23, 24, 25, 26, 27 of the plurality of areas 16–27. A user of the watch radiotelephone 10 is permitted to actuate a predetermined number of the plurality of keys 46–57 of the keypad 14 in a predetermined sequence to enter a telephone number in accordance with a user's familiarity of the plurality of areas 16–28 located around the perimeter 30 of the watch face 12.

Therefore, the keypad 14 provides a suitable arrangement for the watch radiotelephone 10. The keypad 14 provides for manual telephone number entry. To manually enter a telephone number into the watch radiotelephone 10, a user individually actuates a predetermined number of the plurality of keys 46–57 of the keypad 14 in a predetermined sequence.

The location of the keys are familiar to a user, since the individual keys 46, 47, 48, 49, 50, 51, 52, 53, 54, 55, 56, 57 of the keypad 14 are positioned to correspond with individual areas 16, 17, 18, 19, 20, 21, 22, 23, 24, 25, 26, 27 of the plurality of areas 16–27 of the analog format for indicating the time of day. Users of the watch radiotelephone 10 typically already know how to tell the time of day by looking at a watch or a clock displaying the time of day in an analog format using an hour hand and a minute hand. Therefore, users of the watch radiotelephone 10 are already familiar with the twelve areas on the watch face 12 indicating the twelve hours of the day. By positioning the twelve individual keys 46, 47, 48, 49, 50, 51, 52, 53, 54, 55, 56, 57 of the keypad 14 at locations corresponding to the twelve individual areas 16, 17, 18, 19, 20, 21, 22, 23, 24, 25, 26, 27 of the analog format, a user can easily navigate around the keypad 14 without relearning key locations a new keypad arrangement. Thus, the present invention advantageously translates a user's knowledge and familiarity of the analog format for presenting the time of day to a familiar keypad arrangement for entering a telephone number in the watch phone 10.

The plurality of keys 46–57 are easy to actuate using fingers, because the individual keys 46, 47, 48, 49, 50, 51, 52, 53, 54, 55, 56, 57 of the keypad 14 are located around the perimeter 30 of the watch face 12. Any individual key of the plurality of keys 46–57 is bordered by only two opposing adjacent keys. Whereas, an individual key of a conventional twelve key matrix arrangement may be bordered by three, five or eight keys. Thus, the arrangement of the plurality of keys 46–57 of the keypad 14 have less chance of falsing adjacent keys in the present invention.

The arrangement of the plurality of keys 46–57 is aesthetically pleasing and fashionable because the plurality of keys 46–57 of the keypad 14 are located around the perimeter 30 of the watch face 12 and are positioned to correspond with individual areas 16–27 of the plurality of areas 16–27 of the analog format for indicating the time of day. With a conventional watch or clock a person expects some sort of indicia to be located at the perimeter of a watch or clock to present the time of day in the analog format. Therefore, by positioning the plurality of keys 46–57 near the plurality of areas 16–27, the plurality of keys 46–57 effectively blend into the analog format of the watch face in an unassuming and natural way. The plurality of keys 16–27, although functional, can be designed with a distinctive shape, color, texture and material to provide attractive ornamentation for the watch phone 10. The watch face 12 is preferably round, but may be any other shape such as oval, rectangular, square, triangular, or the like.

The plurality of areas 16–27 preferably number twelve areas. The twelve areas 16–27 represent the twelve hours of the day of the analog format for presenting the time of day. The plurality of keys 46–57 preferably number twelve keys to correspond to the twelve hours of the day of the analog format for presenting the time of day. Alternatively, if the watch phone 10 is large enough, the number of the plurality of areas 16–27 and the plurality of keys 46–57 can be increased, such as by placing additional keys between individual ones of the plurality of keys 46–57.

The plurality of indicia 32–43 are preferably located on the watch face 12. Alternatively, the plurality of indicia 32–43 may be located on the plurality of keys 46–58 themselves instead of being located on the watch face 12 or in addition to being located on the watch face 12. Locating the plurality of indicia 32–43 in only one of the two locations reduces clutter on the watch radiotelephone 10 without sacrificing functionality.

The plurality of indicia 32–43 are preferably represented as Arabic numerals. Alternatively, the plurality of indicia 32–43 may be represented as Roman numerals or any other marking, as is well known in the art. The plurality of indicia 32–43 may even be the plurality of keys 46–58 themselves, since they provide twelve identifying marks around the perimeter 30 of the watch face 12.

The plurality of indicia 32–44 are preferably located on the watch face 12. The individual keys 46, 47, 48, 49, 50, 51, 52, 53, 54, 55, 56, 57 of the plurality of keys 46–57 are preferably positioned adjacent to corresponding individual indicia 32, 33, 34, 35, 36, 37, 38, 39, 40, 41, 42, 43 of the plurality of indicia 32–43. With this arrangement, a user can see the individual indicia corresponding to the individual key being actuated while the individual key is being actuated.

The watch radiotelephone 10 further comprises a bezel 60 disposed outside of and around the perimeter 30 of the watch face 12.

The plurality of keys 46–58 are preferably disposed on the bezel 60. The bezel 60 is preferably part of a top housing of the watch radiotelephone 10. Alternatively, the bezel 60 may be a removable ornamental feature or a functional feature which permits a user to change the appearance of the watch radiotelephone 10 by exchanging the bezel 60 and the plurality of keys 46–57.

The plurality of indicia 32–43 are located on the watch face 12. The individual keys 46', 47', 48', 49', 50', 51', 52', 53', 54', 55, 56', 57'of the plurality of keys 46'–57'are alternatively positioned above corresponding individual indicia 32, 33, 34, 35, 36, 37, 38, 39, 40, 41, 42, 43 of the twelve indicia 32–43. The watch radiotelephone 10 further comprises a lens 62 and a touch screen keypad 64. The lens 62 covers the watch face 12. The touch screen keypad 64, forming the individual keys 46', 47', 48', 49', 50', 51', 52', 53', 54', 55', 56', 57'of the plurality of keys 46'–57', is disposed on the lens 62. The alternative location of the plurality of keys 46'–57'using a touch screen keypad 64 is shown in FIG. 1 by the light shading on the lens 62 above each of the twelve indicia 32–43.

The watch face 12 further comprises an hour hand 66 and a minute hand 68. A first end 70 of the hour hand 66 and a first end 72 of the minute hand 68 are disposed at a center 74 of the watch face 12. A second end 76 of the hour hand 66 and a second end 78 of the minute hand 68 radially extend from the center 74 of the watch face 12. The second end 76 of the hour hand 66 and the second end 78 of the minute hand 68 move in a clockwise circular pattern relative to the center 74 of the watch face 12 in accordance with time passing. A position of the second end 76 of the hour hand 66 relative to the plurality of indicia 32 –43 and a position of the second end 78 of the minute hand 68 relative to the plurality of indicia 32–43 provide an indication of the time of day in the analog format. Thus, the watch radiotelephone 10 provides a user with the time of day in an analog format in combination with providing radiotelephone functions. Preferably, at least one of the second end 76 of the hour hand 66 and the second end 78 of the minute hand 68 temporarily points to one key 46, 47, 48, 49, 50, 51, 52, 53, 54, 55, 56, 57 of the plurality of keys 46–57 when actuated to provide confirmation to the user which one key 46, 47, 48, 49, 50, 51, 52, 53, 54, 55, 56, 57 of the plurality of keys 46–57 was actuated. This is implemented by having the timekeeping circuit or mechanism respond to key signals generated by the keypad 14 and sent to the controller 96 (see FIG. 2) when the plurality of keys 46–57 are actuated. In operation, the minute hand, for example, points to the key actuated until the next key is actuated. After a predetermined time delay without a key actuation, the minute hand returns to its timekeeping position. This feature provides a user with valuable feedback as to which key is being depressed when the key is depressed so that a mistaken telephone number is not entered. With this feature, an auxiliary digital display is not necessary to provide such feedback.

Further, preferably at least one of the second end 76 of the hour hand 66 and the second end 78 of the minute hand 68 temporarily points to each one of the predetermined number of the plurality of keys 46–57 of the keypad in the predetermined sequence representing the telephone number to provide confirmation to the user of the telephone number entered. In operation, the minute hand, for example, points to each of the keys actuated for approximately one second to give the user time to recognize or record the telephone number entered. This feature is activated by a user via control or function keys on the keypad 14 or using other auxiliary keys. The minute hand, for example, preferably moves in either a clockwise or a counterclockwise direction to point to the next key. In a similar manner as described hereinabove, this feature provides a user with feedback of the entire telephone number entered after all the keys were depressed. With this feature, an auxiliary digital display is also not necessary to provide such feedback.

Alternatively, the watch face 12 indicates the time of day in a digital format. This is accomplished using an auxiliary digital display 112 (see FIG. 2) located on the watch face. Note the significance of this alternative. The watch radiotelephone 10 does not necessarily have to provide the time of day in the analog format. An advantage of the present invention is provided by placing the plurality of keys 46–57 at locations of the analog format which a user is already familiar with. Therefore, although there may be twelve keys disposed at the perimeter 30 of the watch face 12 corresponding to the twelve hours in the day according to the analog format for providing time, the watch phone 10 does not need to actually provide the time of day in the analog format. The analog format is advantageously used, in this case, to provide a user with a familiar keypad arrangement which is easy to use and aesthetically pleasing to look at. The auxiliary digital display 102 provides the time of day in the digital format. Alternatively, both the analog format and the digital format may be provided together on the watch radiotelephone 10, if so desired.

Particularly, the plurality of indicia 32–43 further comprise: a first indicia 32 representative of a first hour of the day; a second indicia 33 representative of a second hour of the day; a third indicia 34 representative of a third hour of the day; a fourth indicia 35 representative of a fourth hour of the day; a fifth indicia 36 representative of a fifth hour of the day; a sixth indicia 37 representative of a sixth hour of the day; a seventh indicia 38 representative of a seventh hour of the day; an eighth indicia 39 representative of an eighth hour of the day; a ninth indicia 40 representative of a ninth hour of the day; a tenth indicia 41 representative of a tenth hour of the day; an eleventh indicia 42 representative of an eleventh hour of the day; and a twelfth indicia 43 representative of a twelfth hour of the day.

Particularly, the plurality of keys 46–57 further comprise: a first key 46 representative of telephone key number one; a second key 47 representative of telephone key number two; a third key 48 representative of telephone key number three; a fourth key 49 representative of telephone key number four; a fifth key 50 representative of telephone key number five; a sixth key 51 representative of telephone key number six; a seventh key 52 representative of telephone key number seven; a eighth key 53 representative of telephone key number eight; a ninth key 54 representative of telephone key number nine; a tenth key 55 representative of telephone key number zero; an eleventh key 56 representative of a first telephone key function; and a twelfth key 57 representative of a second telephone key function.

Preferably, the first key 46, the second key 47, the third key 48, the fourth key 49, the fifth key 50, the sixth key 51, the seventh key 52, the eighth key 53, the ninth key 54, the tenth key 55, the eleventh key 56 and the twelfth key 57 are positioned to correspond to the first indicia 32, the second indicia 33, the third indicia 34, the fourth indicia 35, the fifth indicia 36, the sixth indicia 37, the seventh indicia 38, the eighth indicia 39, the ninth indicia 40, the tenth indicia 41, the eleventh indicia 42, and the twelfth indicia 43, respectively.

The first telephone key function, representing the eleventh key 56, is a SEND function of a cellular radiotelephone. The second telephone key function, representing the twelfth key 57, is an END function of the cellular radiotelephone. The SEND function and the END function may also be reversed on the keys, if so desired.

Alternatively, the first telephone key function, representing the eleventh key 56, is a star (*) function of a conventional telephone. The second telephone key function, representing the twelfth key 57, is a pound (#) function of a conventional telephone. The star (*) and the pound (#) may also be reversed on the keys, if so desired. Further, any other function may be assigned to the eleventh key 56 and the twelfth key 57.

FIG. 2 illustrates a block diagram of the watch radiotelephone 10. A radiotelephone portion 90 of the watch radiotelephone 10 is preferably a cellular radiotelephone, but may also be a cordless radiotelephone or a personal communication service (PCS) radiotelephone. The radiotelephone portion 90 may be constructed in accordance with an analog communication standard or digital communication standard. The radiotelephone portion 90 generally includes a radio frequency (RF) transmitter 92, a RF receiver 94, a controller 96, an antenna 98, a battery 100, a duplex filter 112, a frequency synthesizer 104, and a user interface 106 including a keypad 14, control switches 110, a digital display 102, an earpiece 114 and a microphone 116. The radiotelephone portion 90 may also include a paging receiver 119. The watch portion 116 of the watch radiotelephone 10 includes a timekeeping circuit 118 or a timekeeping mechanical mechanism.

In operation, the controller 96 receives signals from the keypad 114 indicative of a telephone number entered by the user. The controller 96 sends signals to the transmitter 92 for transmitting the telephone number.

What is claimed is:

1. A watch radiotelephone comprising:
   a radio frequency transmitter;
   a controller coupled to the radio frequency transmitter;
   a watch face with twelve areas located around a perimeter thereof;
   a 1 key, positioned in a first area indicating a first hour of day;
   a 2 key, positioned in a second area indicating a second hour of day;
   a 3 key, positioned in a third area indicating a third hour of day;
   a 4 key, positioned in a fourth area indicating a fourth hour of day;
   a 5 key, positioned in a fifth area indicating a fifth hour of day;
   a 6 key, positioned in a sixth area indicating a sixth hour of day;
   a 7 key, positioned in a seventh area indicating a seventh hour of day;
   a 8 key, positioned in an eighth area indicating an eighth hour of day;
   a 9, positioned in a ninth area indicating a ninth hour of day;
   a 0 (zero) key, positioned in one of a tenth area indicating a tenth hour of day and a twelfth area indicating a twelfth hour of day;
   a first telephone function key, positioned in an eleventh area indicating an eleventh hour of day; and
   a second telephone function key positioned in a remaining one of the tenth area and the twelfth area,
   the keys coupled to the controller;
   a timekeeping circuit for providing time of day to the watch face,
   wherein a user of the watch radiotelephone is permitted to actuate the keys to enter a telephone number.

2. A watch radiotelephone according to claim 1, wherein the watch face further comprises an hour hand and a minute hand, wherein a first end of the hour hand and a first end of the minute hand are disposed at a center of the watch face, wherein a second end of the hour hand and a second end of the minute hand radially extend from the center of the watch face, wherein the second end of the hour hand and the second end of the minute hand move in a clockwise circular pattern relative to the center of the watch face in accordance with time passing, and wherein a position of the second end of the hour hand and a position of the second end of the minute hand provide an indication of the time of day in an analog format.

3. A watch radiotelephone according to claim 1 wherein twelve indicia, representing time of day in an analog format, are located on the watch face.

4. A watch radiotelephone according to claim 3 wherein each one of the twelve indicia corresponds to a unique hour of day in the analog format.

5. A watch radiotelephone according to claim 4 wherein each key is positioned adjacent to a corresponding individual indicia of the twelve indicia.

6. A watch radiotelephone according to claim 1 further comprising:
   a bezel disposed outside of and around the perimeter, wherein the keys are disposed on the bezel.

7. A watch radiotelephone according to claim 1 wherein the first telephone function key operates a SEND function of a radiotelephone.

8. A watch radiotelephone according to claim 7 wherein the second telephone function key operates an END function of the radiotelephone.

9. A watch radiotelephone according to claim 7, the radio frequency transmitter for transmitting a radio frequency signal, representative of the telephone number, upon actuation of the first telephone function key.

10. A watch radiotelephone comprising:
a radio frequency transmitter;
a controller coupled to the radio frequency transmitter;
a watch face with twelve indicia representing twelve hours in a day in an analog format;
a keypad coupled to the controller,
the keypad including individual keys positioned to correspond with individual indicia of the twelve indicia, wherein the twelve keys comprise:
  a first key representative of the number 1 positioned to correspond with a first indicia;
  a second key representative of the number 2 positioned to correspond with a second indicia;
  a third key representative of the number 3 positioned to correspond with a third indicia;
  a fourth key representative of the number 4 positioned to correspond with a fourth indicia;
  a fifth key representative of the number 5 positioned to correspond with a fifth indicia;
  a sixth key representative of the number 6 positioned to correspond with a sixth indicia;
  a seventh key representative of the number 7 positioned to correspond with a seventh indicia;
  an eighth key representative of the number 8 positioned to correspond with an eighth indicia;
  a ninth key representative of the number 9 positioned to correspond with a ninth indicia;
  a tenth key representative of the number 0 (zero);
  an eleventh key representative of a first telephone function; and
  a twelfth key representative of a second telephone function, wherein each one of the tenth key, the eleventh key and the twelfth key is positioned to correspond with each one of a tenth indicia, an eleventh indicia, and a twelfth indicia, without regard to any particular individual correspondence, whereby a telephone number may be input by actuating one or more of the twelve keys.

11. A watch radiotelephone according to claim 10 wherein individual keys of the keypad are positioned adjacent to corresponding individual indicia of the twelve indicia.

12. A watch radiotelephone according to claim 10 wherein the first telephone function is a SEND function of a radiotelephone.

13. A watch radiotelephone according to claim 12 wherein the second telephone function is an END function of the radiotelephone.

14. A watch radiotelephone according to calim 12, wherein the radio frequency transmitter is for transmitting a radio frequency signal representative of a telephone number upon actuation of the eleventh key.

15. A watch radiotelephone comprising:
a watch face for indicating a time of day in an analog format;
twelve indicia located around a perimeter of the watch face that represent twelve hours in a day;
an hour hand having a first end disposed at a center of the watch face and a second end extending radially from the center of the watch face for moving in a clockwise circular pattern relative to the center of the watch face in accordance with time passing;
a minute hand having a first end disposed at the center of the watch face and a second end extending radially from the center of the watch face for moving in a clockwise circular pattern relative to the center of the watch face in accordance with time passing, wherein a position of the second end of the hour hand relative to the twelve indicia and a position of the second end of the minute hand relative to the twelve indicia indicate the time of day;
a bezel disposed around a perimeter of the watch face; and
a keypad with a 1 key positioned adjacent to a first indicia, a 2 key positioned adjacent to a second indicia, a 3 key positioned adjacent to a third indicia, a 4 key positioned adjacent to a fourth indicia, a 5 key positioned adjacent to a fifth indicia, a 6 key positioned adjacent to a sixth indicia, a 7 key positioned adjacent to a seventh indicia, an 8 key positioned adjacent to a eighth indicia, a 9 key positioned adjacent to a ninth indicia, a 0 (zero) key, a first telephone function key, and a second telephone function key,
wherein each one of the 0 (zero) key, the first telephone function key and the second telephone function key is positioned adjacent to each one of a tenth indicia, an eleventh indicia, and a twelfth indicia, without regard to any particular individual correspondence,
a radio frequency transmitter for transmitting a radio frequency signal representative of the telephone number input by the keypad when the first telephone function key is activated;
a timekeeping circuit for providing the time of day to the watch face.

16. A watch radiotelephone according to claim 15 wherein the first telephone key function operates a SEND function of a radiotelephone.

17. A watch radiotelephone according to claim 16 wherein the second telephone key function operates an END function of the radiotelephone.

18. A watch telephone comprising:
a housing;
a radiotelephone transceiver disposed in the housing;
a controller coupled to the radiotelephone transceiver;
a watch face on a side of the housing, the watch face having a variable time indicating display portion;
a plurality of input keys coupled to the controller, at least some of the plurality of input keys are numeric telephone number input keys arranged in spaced apart relation about the variable time indicating display portion of the watch face,
numerical indicia corresponding to the integer numerals 1, 2, 3, 4, 5, 6, 7, 8, 9, 10, 11 and 12 disposed about the variable time indicating portion of the watch face, each of the plurality of input keys aligned radially with a corresponding one of the time indicating indicia,
whereby the radiotelephone transceiver transmits a radio frequency signal representative of a telephone number input by the numeric telephone number input keys.

19. The watch telephone of claim 18, a bezel disposed about the watch face, the plurality of input keys disposed in spaced apart relation on the bezel.

20. The watch telephone of claim 18, the plurality of input keys correspond to the time indicating indicia.

21. The watch telephone of claim 18, the plurality of input keys arranged in a generally circular pattern.

* * * * *